United States Patent [19]

Tsuji

[11] Patent Number: 4,963,005
[45] Date of Patent: Oct. 16, 1990

[54] ZOOM LENS HAVING BUILT-IN DIAPHRAGM

[75] Inventor: Sadahiko Tsuji, Kanagawa, Japan

[73] Assignee: Canon Kabushiki Kaishi, Tokyo, Japan

[21] Appl. No.: 44,776

[22] Filed: May 1, 1987

[30] Foreign Application Priority Data

May 14, 1986 [JP] Japan ................. 61-109982

[51] Int. Cl.⁵ .......................................... G02B 15/177
[52] U.S. Cl. ................................. 350/426; 350/450
[58] Field of Search ............. 350/426, 423, 427, 450

[56] References Cited

U.S. PATENT DOCUMENTS

| 3,918,797 | 11/1975 | Takano | 350/450 X |
| 4,315,669 | 2/1982 | Fujii | 350/426 |
| 4,591,235 | 5/1986 | Tokumaru et al. | 350/426 X |
| 4,763,998 | 8/1988 | Tsuji et al. | 350/427 |

FOREIGN PATENT DOCUMENTS 55-60911  5/1980  Japan ................. 350/426

Primary Examiner—Scott J. Sugarman
Attorney, Agent, or Firm—Fitzpatrick, Cella, Harper & Scinto

[57] ABSTRACT

A zoom lens comprising, from front to rear, a first lens unit of negative power and a second lens unit of positive power, both lens being axially moved to effect zooming, in which a diaphragm is arranged between the first and second lens units to remain stationary during zooming.

10 Claims, 2 Drawing Sheets

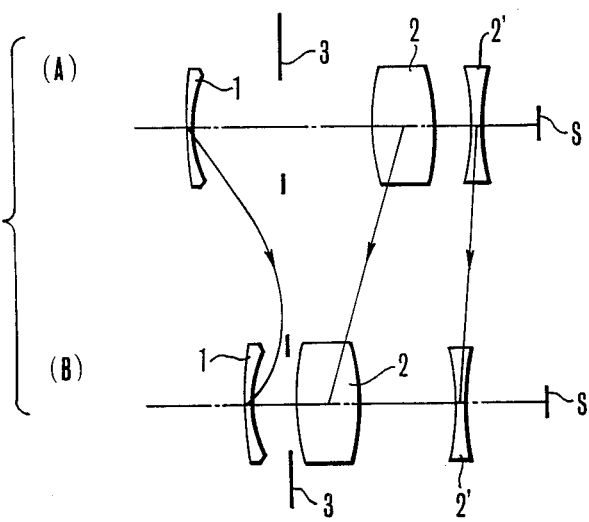

ZOOM LENS HAVING BUILT-IN DIAPHRAGM

BACKGROUND OF THE INVENTION

1. Field of the Invention

This invention relates to zoom lenses, and more particularly to zoom lenses with the entire lens system being reduced in size and weight so as to be particularly to video cameras.

2. Description of the Prior Art

There has been the trend of advancing minimization of the length of zoom lenses in longitudinal and lateral directions and, zoom lenses of relatively small size for 35mm cameras are proposed in, for example, Japanese Laid-Open Patent Application No. Sho 59-16248, U.S. Pat. No. 4,159,865, and U.S. Pat. Application Ser. No. 733,856, now U.S. Pat. No. 4,746,160.

These publication disclose a so-called 2-unit form of zoom lens of which the first lens unit, counting from the front, is of negative power and the second lens unit is of positive power. When zooming, the first and second lens units are axially moved, while varying their air separation, respectively non-linearly and linearly forward.

In this 2-unit zoom lens, the first lens unit has two functions i.e. focusing and compensating for the shift of the image plane that accompanies the variation of the magnification, and the second lens unit has two functions i.e. varying the magnification and forming an image. Since the 2-unit form is relatively favorable to increase the image angle of the zoom lens, it has been widely used in wide angle zoom lenses.

It has been the general practice in the art of 2-unit zoom lenses that a diaphragm movable with zooming and capable of determining the F-number of the lens is located within the second lens unit.

Therefore, in a case where the 2-unit zoom lens is mounted on a video camera, a mechanism for driving the diaphragm is apt to become complicated. The reason for this is that, in such a video camera, an actuator such as one meter coupled to the diaphragm is generally controlled on the basis of a video signal produced by an image pickup tube.

SUMMARY OF THE INVENTION

It is an object of the invention to provide a zoom lens of the 2-unit type adapted for use in a video camera or the like with an advantage of shortening the total length of the entire system and minimizing the size of the lens system, while still avoiding an increase of the complexity of the structure of the diaphragm mechanism and permitting a simplification of the mechanical aspect.

BRIEF DESCRIPTION OF THE DRAWINGS

FIG. 3 is a diagram taken to explain the locus of motion of the lens units of the zoom lens according to the invention.

DESCRIPTION OF THE PREFERRED EMBODIMENTS

Figure 1:
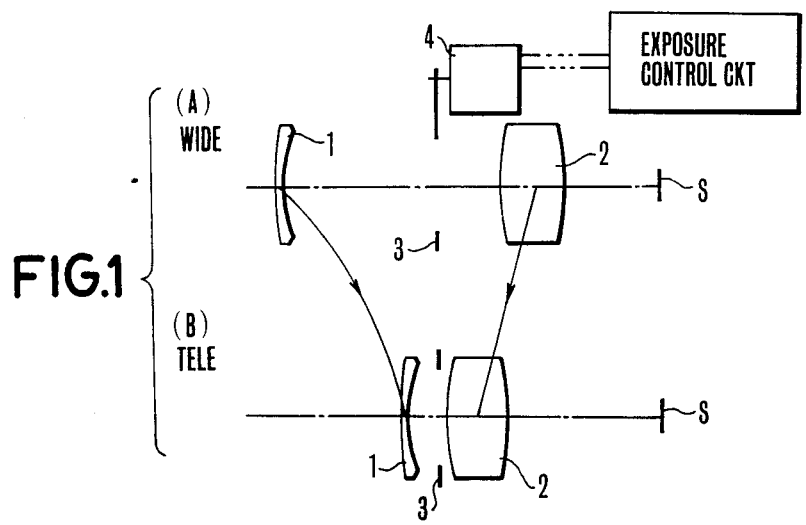
FIGS. 1 and 2 are diagrams illustrating the construction and arrangement of numerical examples 1 and 2 of zoom lenses according to the present invention.

FIG. 1 illustrates an embodiment of a zoom lens according to the present invention. In FIG. 1, (A) represents a zooming position for the wide angle end, and (B) another zooming position for the telephoto end. In FIG. 1, the zoom lens comprises a first lens unit or group 1 of negative power and a second lens unit or group 2 of positive power, and in which, each is shown as only one lens for the purpose of convenience, each consists of a plurality of lenses. A diaphragm 3 is arranged in a space between the first and second lens units 1 and 2 to be stationary relative to an image plane S during zooming. An actuator 4 controls the diameter of the aperture opening of the diaphragm 3 to determine the F-number of the lens system, being constructed, for example, with a meter controlled by an electrical signal from an exposure control circuit. The image plane S coincides with a light receiving surface of, for example, a solid state image pickup device.

In this embodiment, the first lens unit is axially moved non-linearly as indicated by an arrow, and the second lens unit is axially moved forward linearly, while the air separation therebetween is varied, when zooming from the wide angle end to the telephoto end.

It should be pointed out here that the separation between the first lens unit and the diaphragm in the telephoto position is made as short as possible to produce an advantage of achieving a valuable reduction in the diameter of the first lens unit.

That is, the diameter of the first lens unit in most cases is determined by the height of incidence of the oblique pencil in the wide angle positions. On this account, by arranging the diaphragm as close to the first lens unit as possible, the height of incidence of the oblique pencil on the first lens unit is made as low as possible, permitting a reduction of the diameter of the first lens unit to be achieved.

The use of such a feature will, on the other hand, cause the diameter of the second lens unit to increase. But, in general, the diameter of the second lens unit does not become so large as that of the first lens unit. Also, in application to the video camera, because the picture format is relatively small in size, such an increase of the diameter is small and no serious problem arises in actual practice.

Next, a numerical example 1 of the zoom lens of the invention is shown in Table-1. In the numerical example, f1 and f2 are the focal lengths of the first and second lens units respectively; F is the focal length of the entire system; e1 is the air separation between the first lens unit and the diaphragm; e2 is the air separation between the diaphragm and the second lens unit; and bf is the back focal distance.

TABLE 1

| | Numerical Example 1 | |
|---|---|---|
| | Wide Angle End (A) | Telephoto End (B) |
| e1 | 34.67 | 8 |
| e2 | 21.33 | 8 |
| F | 8 | 24 |
| bf | 26.67 | 40 | f1 = −24; f2 = 20

In this numerical example, the magnification $\beta_{2T}$ of the second lens unit at the telephoto end is −1, and, as zooming from the wide angle end to the telephoto end, the first lens unit moves axially non-linearly but in one direction toward the image plane. For this reason, because the diaphragm is arranged to remain stationary between the first and second lens units during zooming, if no mechanical interference occurs when zoomed to the telephoto end, there is no possibility of occurrence of a mechanical interference throughout the entire zooming range. However, when the magnification $\beta_{2T}$ of the second lens unit in the telephoto end becomes lower than −1.0, the locus of movement of the first lens unit with zooming changes to a convexity toward the rear as shown in FIGS. 3(A) and 3(B), or the first lens unit moves back and forth. For this case, it is at a zooming position where the magnification $\beta_2$ of the second lens unit is −1 that the first lens unit takes the rearmost position. Meanwhile, the second lens unit takes the frontmost position when in the zooming position of the telephoto end. In order to avoid a mechanical interference in either of these zooming positions, therefore, the interval between the principal points of the first and second lens units must be increased. As a result, the total length of the lens tends to increase.

Hence, from the point of view of removing the wasteful space, it is preferred to give the following range for the magnification $\beta_{2T}$ of the second lens unit in the telephoto end:

$$|\beta_{2T}| \leq 1, \text{ where } \beta_{2T} < 0 \quad (1)$$

But, if otherwise considered, the case that the first lens unit, when zooming, reciprocatingly moves in a locus convex toward the rear, and such a reciprocating movement is made so perfect that its axial positions for the wide angle and telephoto ends coincide with each other, there will be provided the possibility of shortening the total length of the lens at most. Therefore, the condition that the distance L between the rearmost possible position and the telephoto position of the first lens unit is below a certain value becomes more advantageous at the accomplishment of the object of shortening of the total length of the lens and eliminating the dead space.

The above-defined distance L in terms of the focal length f2 of the second lens unit is given by the following expression:

$$L = ((2 - \beta_{2T} - 1/\beta_{2T}) - 4)f2$$

By various investigations it has been found that the allowance of this distance L up to about 1/10 of the focal length f2 becomes advantageous in shortening the total length of the lens and removing the dead space.

Hence, from L < f2/10, $$|\beta_{2T}| < 1.37 \quad (2)$$

is obtained.

If the zoom lens is so designed that the magnification of the second lens unit, when in the telephoto position, satisfies the inequality of condition (2), achievement of the above-described object is facilitated. When the absolute value of the magnification increases beyond the inequality of condition (2), the reciprocating movement with zooming of the first lens unit is increased too much, and the dead space is increased objectionably.

Next, a numerical example of a zoom lens designed so as to satisfy the inequality of condition (2) is shown in Table-2. The symbols used in Table-2 are the same as those used in Table-1.

TABLE 2

| | Numerical Example 2 | | |
|---|---|---|---|
| | Wide Angle | Middle | Telephoto |
| e1 | 20.67 | 7.22 | 9.04 |
| e2 | 26 | 15 | 8 |
| F | 8 | 17.78 | 24 |

TABLE 2-continued

| | Numerical Example 2 | | |
|---|---|---|---|
| | Wide Angle | Middle | Telephoto |
| bf | 29 | 40 | 47 | f1 = −17.78; f2 = 20; $\beta_{2T}$ = −1.35

Figure 2:
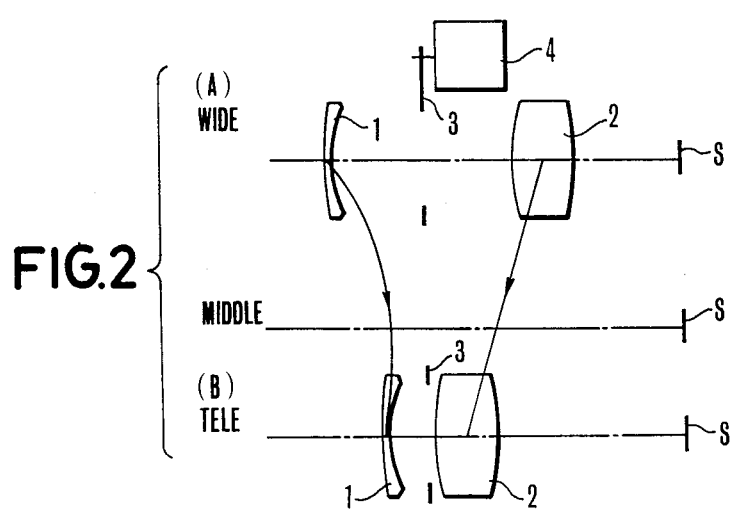

The construction and arrangement of the numerical example 2 of the zoom lens is schematically shown in FIG. 2. In the figure, the same reference characters have been employed to denote the similar parts to those shown in FIG. 1.

In the numerical example 2, a lens design is achieved such that the distance between the rearmost possible position and the telephoto position of the first lens unit or group is 1.815 (mm), and that the dead space is minimized, and the mechanical interference with the diaphragm is avoided.

In each of the above-cited numerical example, the second lens unit may otherwise be constructed as shown in FIG. 3 with two sub-units 2 and 2' which move at different speeds from each other when zooming. Also, the present invention is applicable to still another type of zoom lens which comprises three or more lens units, of which the lens unit 2' on the image side of the second lens unit is made stationary during zooming, provided the absolute value of the power of the stationary lens unit is weaker than the power of the second lens unit.

According to the invention, by arranging a fixed diaphragm between two lens units or groups of prescribed refractive powers movable for zooming, it is made possible to achieve a zoom lens suited particularly to the video camera, since its total length is shortened and the size of the lens system is reduced, while still permitting the diaphragm mechanism to be simplified.

What is claimed is:

1. A zoom lens with a fixed focal plane, comprising: a first lens unit or group having a negative refractive power axially non-linearly movable for zooming; a second lens unit or group arranged next to said first lens unit or group, having a positive refractive power and disposed on the image side of said first lens unit or group to axially move simultaneously with and independently of said first lens unit or group; and a diaphragm arranged between said first and said second lens units or groups to remain stationary relative to said focal plane during zooming.

2. A zoom lens according to claim 1, wherein said first and said second lens units are farthest away from each other at the wide angle end, and are close to each other at the telephoto end.

3. A zoom lens according to claim 1, further comprising a third lens unit between said second lens unit and said focal plane.

4. A zoom lens with a fixed focal plane, comprising: a first lens unit or group having a negative refractive power axially non-linearly movable for zooming; a second lens unit or group arranged next to said first lens unit or group, having a positive refractive power and disposed on the image side of said first lens unit or group to axially move simultaneously with and independently of said first lens unit or group; and a diaphragm arranged between said first and said second lens units or groups to remain stationary relative to said focal plane during zooming;

wherein the lateral magnification β2T of said second lens unit when zoomed in the telephoto end satisfies the following condition:

$|\beta 2T| \leq 1.37$, where $\beta 2T < 0$.

5. A zoom lens with a fixed focal plane, comprising:
a first lens unit or group having a negative refractive power axially non-linearly movable for zooming; a second lens unit or group arranged next to said first lens unit or group, having a positive refractive power and disposed on the image side of said first lens unit or group to axially move simultaneously with and independently of said first lens unit or group; and a diaphragm arranged between said first and said second lens or groups to remain stationary relative to said focal plane during zooming; wherein said first and said second lens units are farthest away from each other at the wide angle end, and are close to each other at the telephoto end;
wherein said first lens unit reciprocates over the zooming range.

6. A zoom lens with a fixed focal plane, comprising:
a first lens unit or group having a negative refractive power axially non-linearly movable for zooming; a second lens unit or group arranged next to said first lens unit or group, having a positive refractive power and disposed on the image side of said first lens unit or group to axially move simultaneously with and independently of said first lens unit or group; and a diaphragm arranged between said first and said second lens unit or groups to remain stationary relative to said focal plane during zooming;
further comprising an actuator whose operation is controlled by an electrical signal to vary the size of an aperture opening of said diaphragm.

7. A zoom lens with a fixed focal plane, comprising:
a first lens unit or group having a negative refractive power axially non-linearly movable for zooming; a second lens unit or group arranged next to said first lens unit or group, having a positive refractive power and disposed on the image side of said first lens unit or group to axially move simultaneously with and independently of said first lens unit or group; and a diaphragm arranged between said first and said second lens or groups to remain stationary relative to said focal plane during zooming;
further comprising an actuator whose operation is controlled by an electrical signal to vary the size of an aperture opening of said diaphragm;
wherein said actuator is a meter.

8. An improved zoom lens consisting of a first unit having a negative refractive power and being axially movable for zooming, a second unit arranged on the image side of said first unit, having a positive refractive power and being movable simultaneously with and independently from said first unit for zooming, and a stationary diaphragm located between said first and second units, and being driven by an actuator controlled by an electrical signal.

9. An improved zoom lens consisting of a first unit having a negative refractive power and being axially movable for zooming, a second unit arranged on the image side of said first unit, having a positive refractive power and being movable simultaneously with and independently from said first unit for zooming, a third unit arranged on the image side of said second unit, and a stationary diaphragm located between said first and second units, and being driven by an actuator controlled by an electrical signal.

10. A zoom lens with a fixed focal plane, comprising:
a first lens unit or group having a negative refractive power axially non-linearly movable for zooming; a second lens unit or group arranged next to said first lens unit or group, having a positive refractive power and disposed on the image side of said first lens unit or group to axially move simultaneously with and independently of said first lens unit or group; and a diaphragm arranged between said first and said second lens units or groups to remain stationary relative to said focal plane during zooming;
wherein said first lens unit is the front most lens unit of said zoom lens.

* * * * *

UNITED STATES PATENT AND TRADEMARK OFFICE
CERTIFICATE OF CORRECTION

PATENT NO. : 4,963,005
DATED : October 16, 1990
INVENTOR(S) : SADAHIKO TSUJI It is certified that error appears in the above-identified patent and that said Letters Patent is hereby corrected as shown below:

Column 1:

Line 8, "particularly" should read
    --particularly suitable--.

Column 3:

Line 20, "$|\beta_{2T}| \leq 1$, where $\beta_{2T}<0$ (1)" should read
    --$|\beta_{2T}| \leq 1$, where $\beta_{2T}<0$      (1)--.

Line 40, $L = ((2 - \beta_{2T} - 1/\beta_{2T}) - 4)f2$ should read
    "$L=((2-1/\beta_{2T})-4(f2$"

Line 47, "$|\beta_{2T}| < 1.37 (2)$" should read
    --$|\beta_{2T}| < 1.37$      (2)--.

Column 4:

Line 19, "example," should read --examples,--.

UNITED STATES PATENT AND TRADEMARK OFFICE
CERTIFICATE OF CORRECTION

PATENT NO. : 4,963,005      Page 2 of 2
DATED : October 16, 1990
INVENTOR(S) : SADAHIKO TSUJI It is certified that error appears in the above-identified patent and that said Letters Patent is hereby corrected as shown below:

<u>Column 5</u>:

Line 1, "lateral magnification ß2T" should read --lateral magnification $\beta_{2T}$--.

Line 5, "$|\beta 2T| \leq 1.37$, where ß2T<0." should read --$|\beta_{2T}| \leq 1.37$, where $\beta_{2T} < 0$--.

Line 16, "second lens" should read --second lens units--.

<u>Column 6</u>:

Line 42, "front most" should read --frontmost--.

In col. 3, line 20, " ... " is inserted before (1).
In col. 3, line 47, " ... " is inserted before (2).

Signed and Sealed this

Fifteenth Day of September, 1992

*Attest:*

DOUGLAS B. COMER

*Attesting Officer*     *Acting Commissioner of Patents and Trademarks*